United States Patent
Linkert et al.

(10) Patent No.: US 8,356,008 B2
(45) Date of Patent: *Jan. 15, 2013

(54) METHOD AND APPARATUS FOR SYNCHRONIZING OF DATABASES

(75) Inventors: Barry Linkert, Petersberg (CA); Jie Zhu, Waterloo (CA); Salim H. Omar, Waterloo (CA); Kathy A. Pereira, Waterloo (CA); Galang Vuong, Kitchener (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,858

(22) Filed: Aug. 10, 2011

(65) Prior Publication Data

US 2011/0295799 A1 Dec. 1, 2011

Related U.S. Application Data

(63) Continuation of application No. 12/361,868, filed on Jan. 29, 2009, now Pat. No. 8,019,722, which is a continuation of application No. 11/444,388, filed on Jun. 1, 2006, now Pat. No. 7,509,350.

(51) Int. Cl.
*G06F 17/30* (2006.01)

(52) U.S. Cl. ........................... 707/617; 707/621
(58) Field of Classification Search .................. None
See application file for complete search history.

(56) References Cited

U.S. PATENT DOCUMENTS 6,671,700 B1 * 12/2003 Creemer et al. ............. 709/217

OTHER PUBLICATIONS

Suel, Torsten, Patrick Noel, and Dimitre Trendafilov. "Improved File Synchronization Techniques for Maintaining Large Replicated Collections over Slow Networks." ICDE (2004).*
U.S. Appl. No. 12/361,868, filed Jan. 29, 2009 and U.S. Appl. No. 11/444,388, filed Jun. 1, 2006 both entitled "Method and Apparatus for Synchronizing of Databases".

* cited by examiner

*Primary Examiner* — Syed Hasan
(74) *Attorney, Agent, or Firm* — Perry + Currier

(57) ABSTRACT

A method for synchronizing a first database including first data records with a second database including second data records. The method includes starting a synchronization session with an electronic device on which the second database resides, requesting the first data records from the first database, temporarily disconnecting the synchronization session while awaiting receipt of the first data records, receiving the first data records, and restarting and completing the synchronization session.

9 Claims, 7 Drawing Sheets

METHOD AND APPARATUS FOR SYNCHRONIZING OF DATABASES

CROSS-REFERENCE TO RELATED APPLICATION

This application is a continuation of U.S. patent application Ser. No. 12/361,868 filed Jan. 29, 2009 which is a continuation of U.S. application Ser. No. 11/444,388 filed Jun. 1, 2006, entitled "Method and Apparatus for Synchronizing of Databases", the contents of which are incorporated herein by reference.

FIELD

The present application relates generally to portable electronic devices and to the synchronizing of data at a portable electronic device with data embodied at a communication network.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS AND W-CDMA networks.

These portable electronic devices commonly include databases for storing data that is selectably retrievable by a user of a device. The data forms a series of data records, each data record containing one or more fields. During operation of the device, the data is retrieved and displayed, or otherwise made available to the user. The data can be modified, added to or deleted by the user of the device.

Advances in data storage have accompanied advances in portable electronic devices, to provide for back-up of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station.

Other portable electronic devices provide for back-up of data stored thereon to a computing station by way of a radio interface, using, for example, the networks listed above. Thus, data is sent over a radio communication channel of a radio communication system, thereby forming a communications link between the portable electronic device and a remote station (a station not linked by wire communication). Again, once the data is stored in a database at a computing station, the stored data can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station. When a data record on a computing station does not exist on the portable electronic device, or when the content of the data record (the fields of the data record) of the computing station differs from the content of the corresponding data record of the portable electronic device, then the additional data record or differing data record is transferred to the portable electronic device. Similarly, when a data record on a portable electronic device does not exist on the computing station, or when the content of the data record of the portable electronic device differs from the content of the corresponding data record of the computing station, the additional data record or differing data record is transferred to the computing station. When a data record is deleted from the portable electronic device, a delete data record indication is sent from the portable electronic device to the computing station in order to delete the corresponding data record at the computing station. Similarly, when a data record is deleted from the computing station, a delete data record indication is sent from the computing station to the portable electronic device in order to delete the corresponding data record at the portable electronic device.

Data synchronization over a radio communication channel is clearly advantageous as data can be communicated remotely over large distances. Conventional manners of data synchronization over radio communication channels suffer disadvantages, however. When synchronization between a portable electronic device and a remote computing station is initiated, the portable electronic device sends information to the remote computing station and then remains idle as it is engaged in the synchronization process. After sending the information to the remote computing station, data flow from the portable electronic device is blocked while the portable electronic device awaits a response from the remote computing station. While data flow from the portable electronic device is blocked, the remote computing station retrieves the records from the appropriate databases and determines what, if any, records are to be updated in the databases of either the portable electronic device or the remote computing station. In cases where there are many records that are retrieved or when several other portable electronic devices are performing a synchronization with the same computing station, the portable electronic device, the retrieval of records from the appropriate databases and the determination of what records are to be updated can take several minutes. Thus, the portable electronic device remains idle for several minutes while awaiting a response. Clearly a long idle time negatively affects productivity and performance of the portable electronic device.

DETAILED DESCRIPTION OF THE EMBODIMENT

Figure 1:
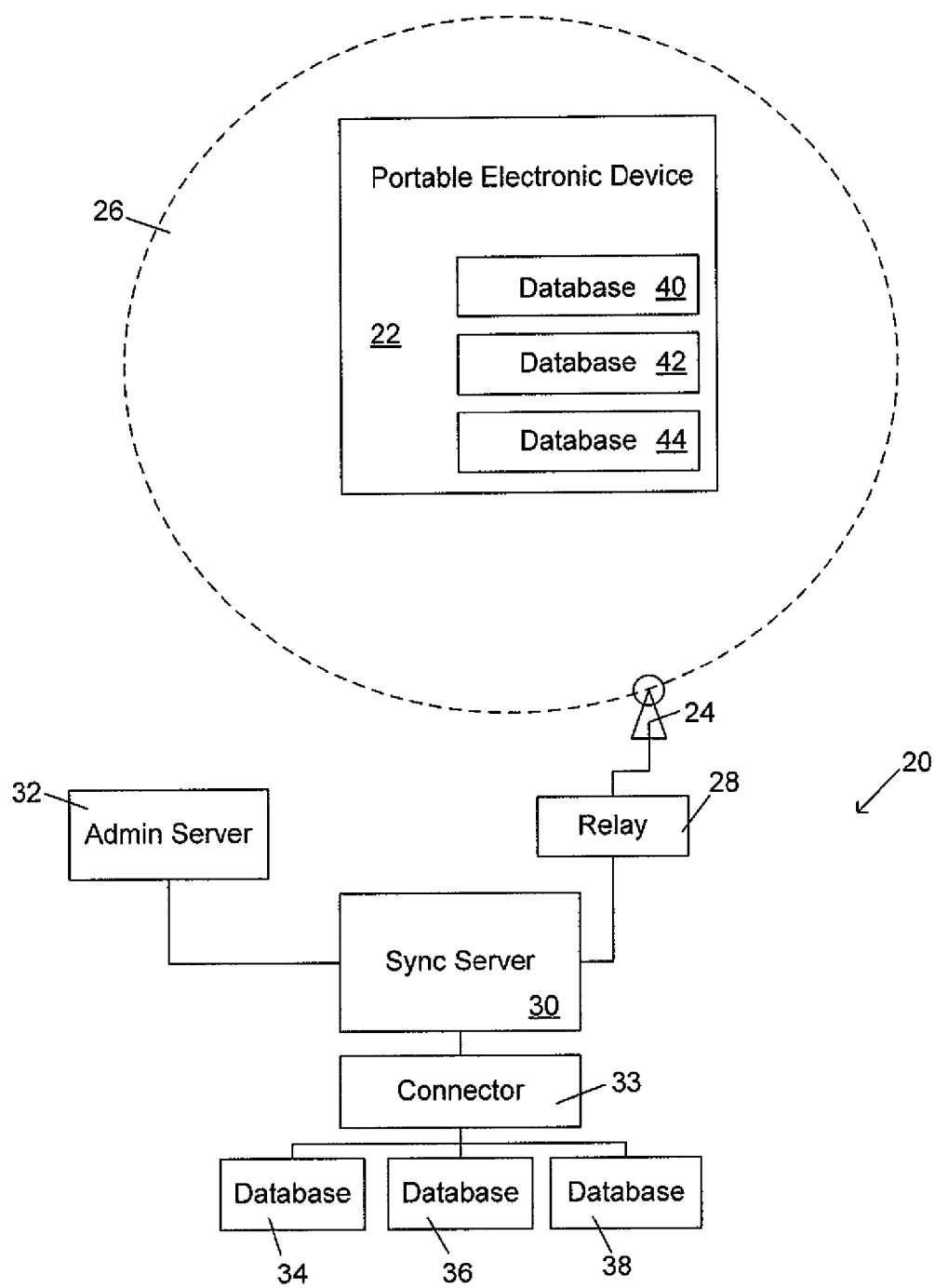
FIG. 1 is a functional block diagram of a radio communication system including a portable electronic device and a communication system having a synchronization server according to one embodiment of the present application.

Reference is first made to FIG. 1 which shows a functional block diagram of a radio communication system indicated generally by the numeral 20. The radio communication system 20 provides for communications with portable electronic devices including the exemplary portable electronic device 22, as shown. The portable electronic device 22 and the radio communication system 20 are operable to effect communications over a radio communications channel therebetween. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communication system 20 is functionally represented in FIG. 1 and a single base station 24 is shown. The base station 24 defines a coverage area, or cell 26 within which communications between the base station 24 and the portable electronic device 22 can be effectuated. It will be appreciated that the portable electronic device 22 is movable within the cell 26 and can be moved to coverage areas defined by other cells that are not illustrated in the present example. The communication system 20 includes a relay device 28 that is connected to the base station 24 and to a synchronization server 30. It will be understood that the functions provided by the relay device 28 and the synchronization server 30 can be embodied in the same device. The synchronization server 30 is connected to an administration server 32, as shown. The administration server 32 provides administrative services to the communications system 20 and, for instance, provides administrative control over the synchronization server 30.

The synchronization server 30 is also functionally coupled through a personal information management connector 33 to databases, of which, three exemplary database types including databases 34, 36 and 38 are shown. The personal information management connector 33 interfaces between the synchronization server 30 and the databases 34, 36, 38. It will be understood that the personal information management connector 33 is a functional component and can be provided by way of an application on the synchronization server 30. The databases of the present example are of a text format such as an Extensible Markup Language (XML) format. The data maintained in the databases 34, 36, 38, includes a number of data records, each data record containing a plurality of fields that are populated with data.

The portable electronic device 22, of which only particular functional portions are shown in FIG. 1 for the purposes of the present description, includes a plurality of databases 40, 42, 44 that correspond to the databases 34, 36, 38, respectively, of the communication system 20. The databases 34, 36, 38 and the databases 40, 42, 44, can be selectably altered in an asymmetrical manner such that the databases 34, 36, 38 of the communication system 20 do not match the databases 40, 42, 44 of the portable electronic device 22. In other words, any or all of the databases 34, 36, 38, 40, 42, 44 can be altered by adding records, deleting records and modifying fields of the records by adding, deleting or modifying the data populating those fields.

Figure 2:
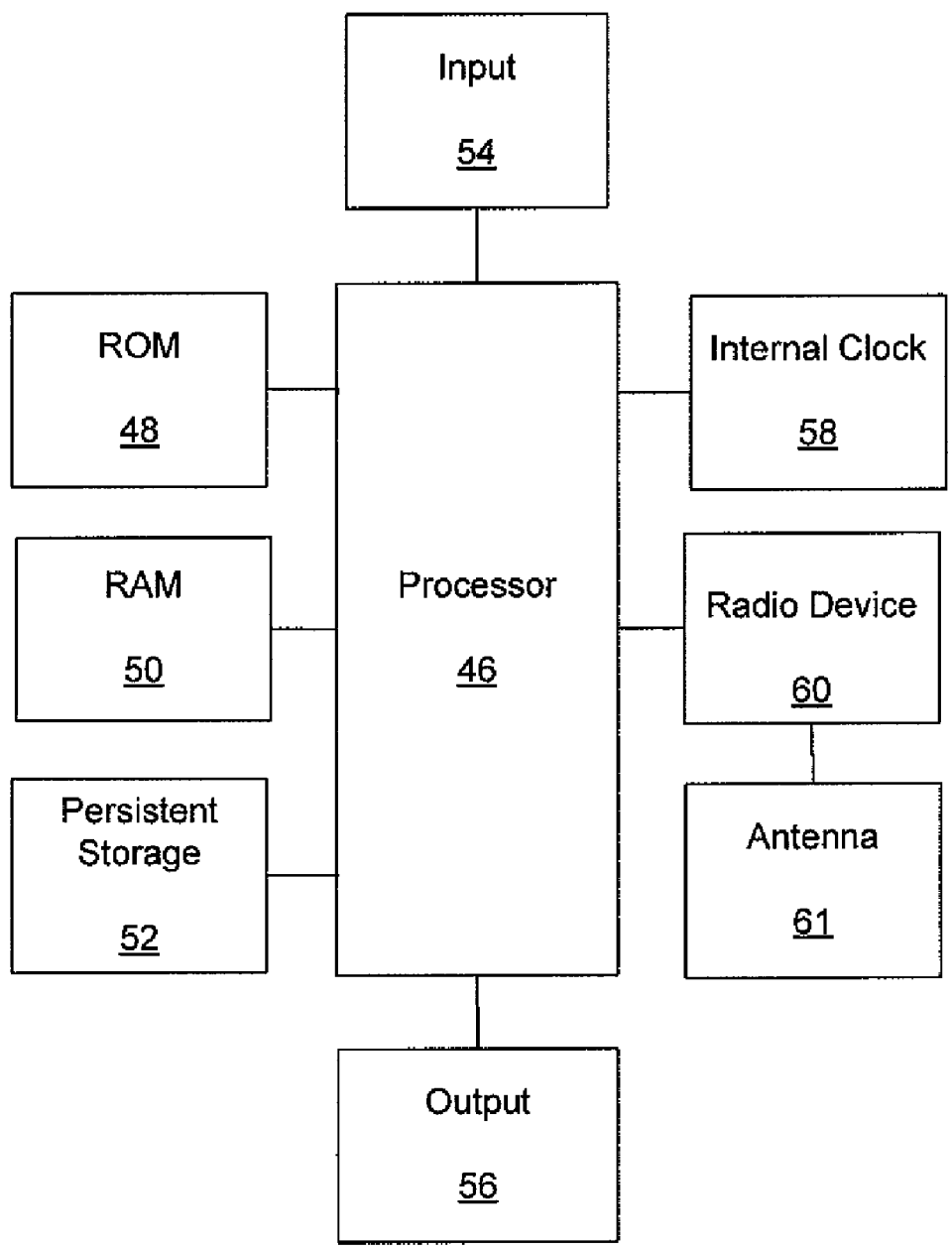
FIG. 2 is a block diagram of certain internal components within the portable electronic device of FIG. 1.

Reference is now made to FIG. 2 which shows a block diagram of certain internal components within the portable electronic device 22. The portable electronic device 22 is based on a microcomputer that includes a processor 46 connected to a read-only-memory (ROM) 48 that contains a plurality of applications executable by the processor 46 to enable the portable electronic device 22 to perform certain functions including synchronization with the communication system 20. The processor 46 is also connected to a random access memory unit (RAM) 50 and a persistent storage device 52 which are responsible for various non-volatile storage functions of the portable electronic device 22 and in which the databases 40, 42, 44 are maintained. The processor 46 receives input from input devices 54 such as a keyboard. The processor 46 outputs to output devices 56 such as a Liquid Crystal Display (LCD). The processor 46 is also connected to an internal clock 58 and a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

It will be understood that the functions described herein can be carried out in any suitable manner. In the present example, the functions are carried out by algorithms executable by the processor 46 in a synchronization application. For example, the processor 46 of the portable electronic device 22 is operable to perform hash functions by retrieving the data from one or more of the databases 40, 42, 44 of the persistent storage device 52 and generating a hash, thereby placing the accessed data in short-digest form. Hash functions performed by the processor 46 include, for example, computation of check sums as well as other hash function computations. The processor 46 is further operable to provide the generated hash to the radio device 60 for transmission from the portable electronic device 22 to the radio communication system 20 over the radio communications channel. Hash generation is triggered either by an input from the input device 54 or by a signal received from communication system 20. The processor is further operable to generate an initiate session command and to transmit the command over the radio communications channel along with the hash. The portable electronic device 22 is operable to receive a temporary disconnect synchronization session command and to store synchronization session state information in the RAM 50. The portable electronic device is further operable to receive a restart synchronization session request and to restart the synchronization session based on the session state information in the RAM 50.

The microcomputer of the portable electronic device 22 is operable to receive communications from the communication system 20. For example, the microcomputer is operable to receive a request for additional hash information and in response, to provide additional hash information by retrieving data from one or more of the databases 40, 42, 44, performing hash functions on the data, thereby generating an additional hash and transmitting the additional hash to the communication system 20. The microcomputer is further operable to receive a request for data records which, in response to such a request, the data records are retrieved from one or more the databases 40, 42, 44 and transmitted to the communication system 20. Further still, the microcomputer is operable to receive data transmitted from the communication system 20 and to write the data by adding the data to one or more of the databases 40, 42, 44 or overwriting data on one or more of the databases 40, 42, 44, maintained on the persistent storage device 52.

Figure 3:
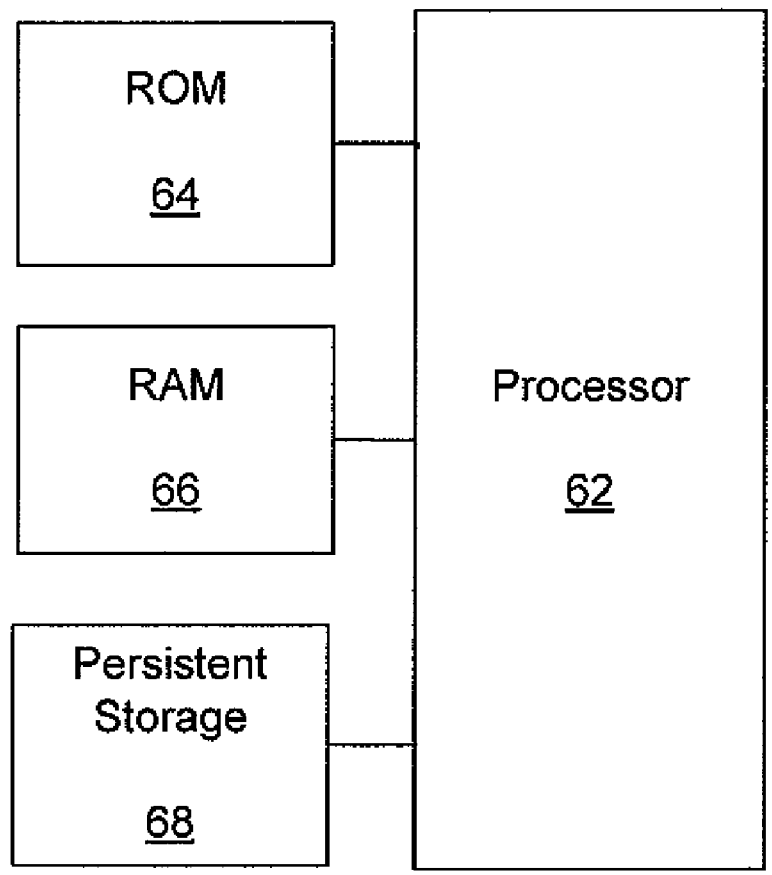
FIG. 3 is a block diagram of certain internal components within the synchronization server of FIG. 1.

Reference is now made to FIG. 3 which shows a block diagram of certain internal components within the synchronization server 30. Similar to the portable electronic device 22, the synchronization server 30 includes a processor 62 connected to a read only memory (ROM) 64 that includes applications executable by the processor 62 and enables the synchronization server 30 to perform certain functions including synchronization with the portable electronic device 22. The processor 62 is also connected to a random access memory unit (RAM) 66 and a persistent storage device 68 which are responsible for various non-volatile storage functions of the synchronization server 30. The processor 62 is functionally connected to the databases 34, 36, 38 through the personal information management connector 33 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Again, it will be understood that the functions described herein can be carried out in any suitable manner. In the present example, the functions are carried out by algorithms executable by the processor 62. For example, the processor 62 of the synchronization server 30 is operable to receive communications generated by the portable electronic device relating to synchronization, including an initialize synchronization command and group hash values representing data from databases of the portable electronic device 22. The synchronization server 30 is further operable to request data records from the personal information management connector 33 and to set a timer upon requesting the data records from the personal information management connector 33, setting a period of time in which to receive a response to the request. The synchronization server 30 is further operable to generate a disconnect synchronization session command and to send the command via the relay 28 and the base station 24 in the event that no response is received to the request within the period of time. The synchronization server 30 is operable to save synchronization session state information and to generate a request to restart the synchronization session in response to receipt of a response to the request and to send the request via the relay 28 and the base station 24.

The synchronization server is operable to perform hash functions upon receipt of the data from one or more of the databases 34, 36, 38 and to generate a locally generated hash, thereby placing the accessed data in short-digest form. The synchronization server 30 is further operable to compare the hash information from the hash received from the portable electronic device 22 to the hash information from the locally generated hash. The synchronization server 30 is also operable to request additional information from the portable electronic device 22, based on and in response to results of the comparison of the hash information from the hash generated by the portable electronic device 22 with the hash information from the locally generated hash. The request for additional information is provided to the relay 28 and, through the base station 24, is transmitted to the portable electronic device 22. The request for additional information can be a request for additional hash information or a request for data records, depending on the results of the comparison of the hash information from the hash generated by the portable electronic device 22 with the hash information from the locally generated hash. Further, the synchronization server 30 is operable to receive data transmitted from the portable electronic device 22 (through the base station 24 and relay device 28) and to write the data by adding the data through the personal information management connector 33, to one or more of the databases 34, 36, 38 or overwriting the data through the personal information management connector 33, on one or more of the databases 34, 36, 38. Further still, the synchronization server 30 stores synchronization history data in the persistent storage device 68, thereby maintaining a listing of changes made to the databases 34, 36, 38 connected through the personal information management connector 33 to the synchronization server 30 and to the databases 40, 42, 44 of the portable electronic device 22. The synchronization server 30 accesses the synchronization history data during synchronization operations to reduce the data communicated between the communication system 20 and the portable electronic device 22 in subsequent synchronizations by determining previously synchronized data.

Figure 4:
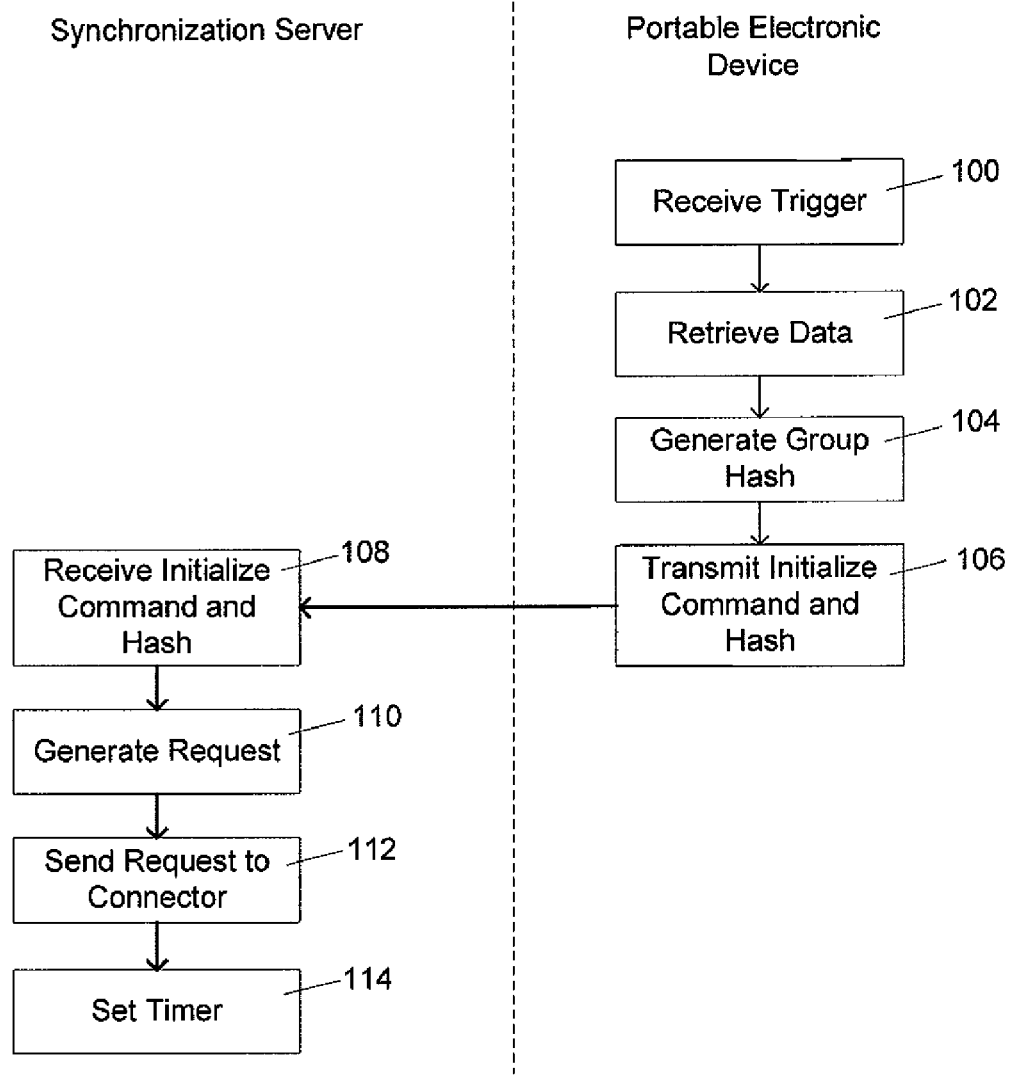
FIG. 4 is a sequence diagram illustrating functions carried out at both the portable electronic device and the communication system of FIG. 1 during synchronization of databases connected by wireless interface.
Figure 5:
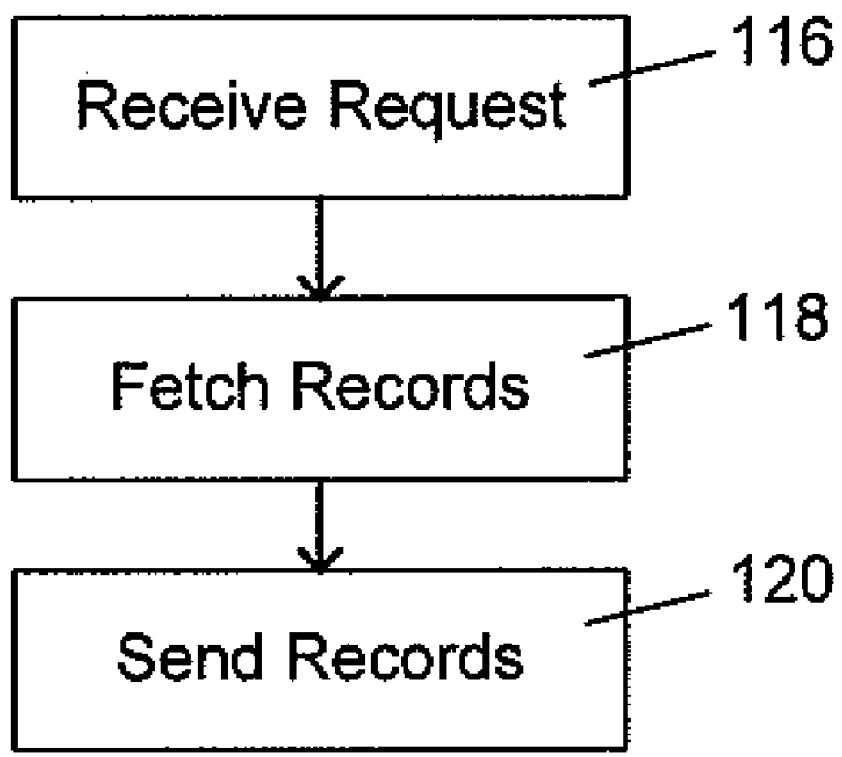
FIG. 5, is a sequence diagram illustrating functions carried out at a personal information management connector of the communication system of FIG. 1.

Reference is now made to FIG. 4, which shows a sequence diagram illustrating functions carried out at both the portable electronic device 22 and the communication system 20 during synchronization of databases connected by wireless interface, in accordance with one embodiment of the present application. Coding of software for carrying out such steps is well within the scope of a person of ordinary skill in the art. First, the portable electronic device 22 receives a synchronization trigger at 100, from, for example, a user input on the input device 54, triggering a synchronization process for one of the databases 40, 42, 44. In the present example, synchronization is triggered for the database 40. In response to receipt of the synchronization trigger, data is retrieved from the database 40 at step 102 and the processor 46 first generates a record hash for each data record of the database 40 and then generates a group hash for the database 40, based on the individual record hashes at step 104. Thus, the group hash is a hash representative of the data records of the database 40. After generation of the group hash, an initialize command is transmitted along with the group hash at step 106 to the communication system 20 over a radio communication channel. The initialize command initiates the synchronization process at the synchronization server 30, identifies the database for synchronization and provides synchronization session state information including a session state identifier. The portable electronic device 22 then awaits a response from the communication system 20. While awaiting a response, the portable electronic device 22 remains idle as it is engaged in the synchronization process. The response can be a termination of the synchronization process in the event that all of the data records of database 40 are determined to match the data records of the corresponding database at the communication system 20, a request for further information in the event of a mismatch, or a temporary suspension of the synchronization process as further described below.

Reference is now made to FIG. 4, which shows a sequence diagram illustrating functions carried out at both the portable electronic device 22 and the communication system 20 during the synchronization of databases connected by a wireless interface, in accordance with one embodiment of the present application. Coding of software for carrying out such steps is well within the scope of a person of ordinary skill in the art. First, the portable electronic device 22 receives a synchronization trigger at 100, from, for example, a user input on the input device 54, triggering a synchronization process for one of the databases 40, 42, 44. In the present example, synchronization is triggered for the database 40. In response to receipt of the synchronization trigger, data is retrieved from the database 40 at step 102 and the processor 46 first generates a record hash for each data record of the database 40 and then generates a group hash for the database 40, based on the individual record hashes at step 104. Thus, the group hash is a hash representative of the data records of the database 40. After generation of the group hash, an initialize command is transmitted along with the group hash at step 106 to the communication system 20 over a radio communication channel. The initialize command initiates the synchronization process at the synchronization server 30, identifies the database for synchronization and provides synchronization session state information including a session state identifier. The portable electronic device 22 then awaits a response from the communication system 20. While awaiting a response, the portable electronic device 22 remains idle as it is engaged in the synchronization process. The response can be a termination of the synchronization process in the event that all of the data records of database 40 are determined to match the data records of the corresponding database at the communication system 20, a request for further information in the event of a mismatch, or a temporary suspension of the synchronization process as further described below.

The communication system 20 receives the initialize command along with the group hash at step 108 by receipt at the base station 24. The base station 24 forwards the initialize command and the group hash to the synchronization server 30. As indicated above, the initialize command identifies the database for synchronization and provides synchronization session state information including the session state identifier. A synchronization session is thereby started with the portable electronic device 22. In response to receipt of the initialize command, the synchronization server 30 generates a request at step 110 for all data records of the database on the communication system 20 side that corresponds with the database being synchronized on the portable electronic device 22. In the present example, the database 34 corresponds with the database 40 of the portable electronic device 22 and thus, it is the records of the database 34 that are requested in the request generated at step 110. The request is then sent to the personal information management connector 33 to retrieve the records of the database 40 at step 112. Upon sending the request to the personal information management connector 33, the synchronization server 30 sets a timer at step 114. In the present example, the synchronization server 30 sets a timer duration of 2 minutes for receiving a response from the personal information management connector 33.

Figure 6:
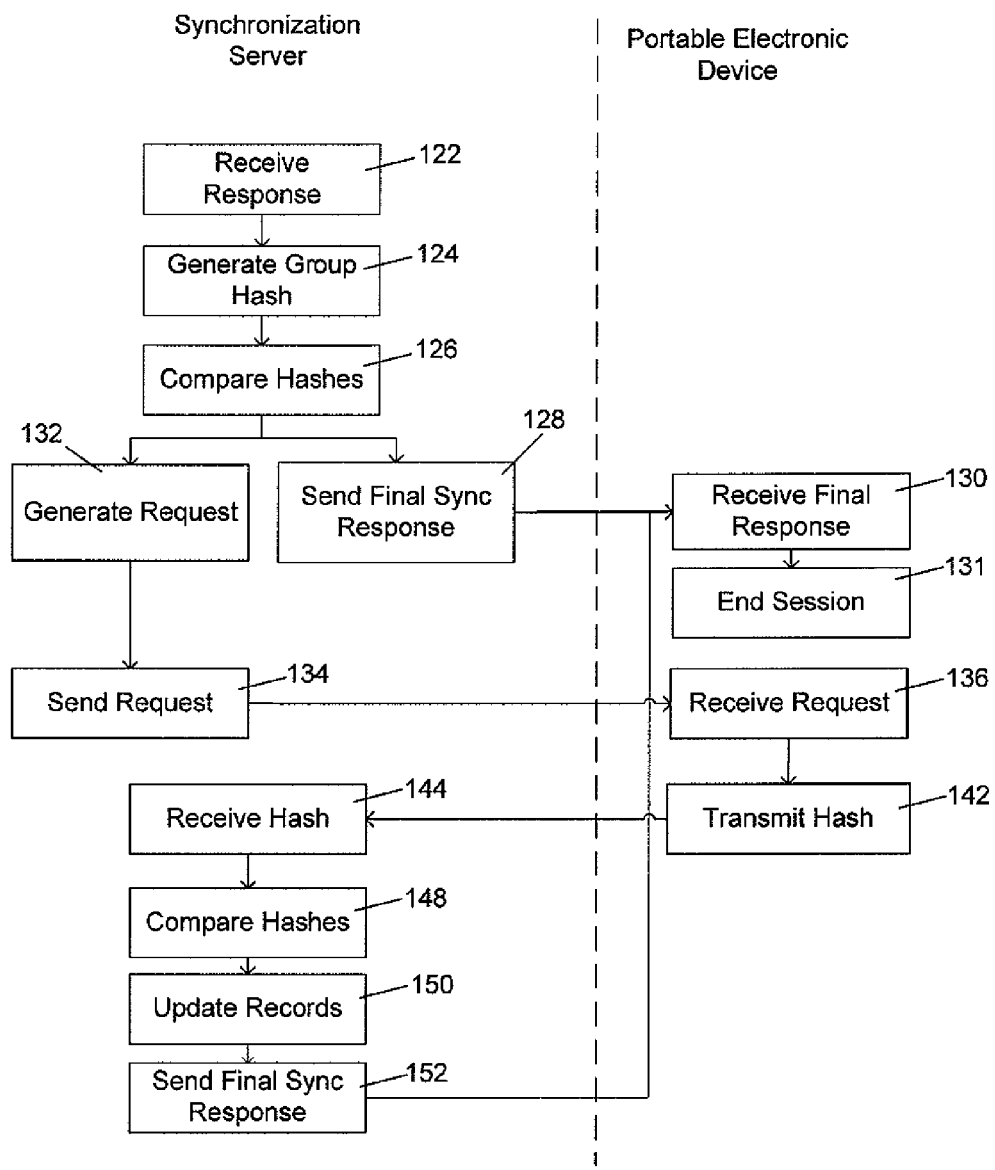
FIG. 6 is a sequence diagram illustrating further functions carried out at both the portable electronic device and the communication system of FIG. 1 during synchronization of databases connected by wireless interface.
Figure 7:
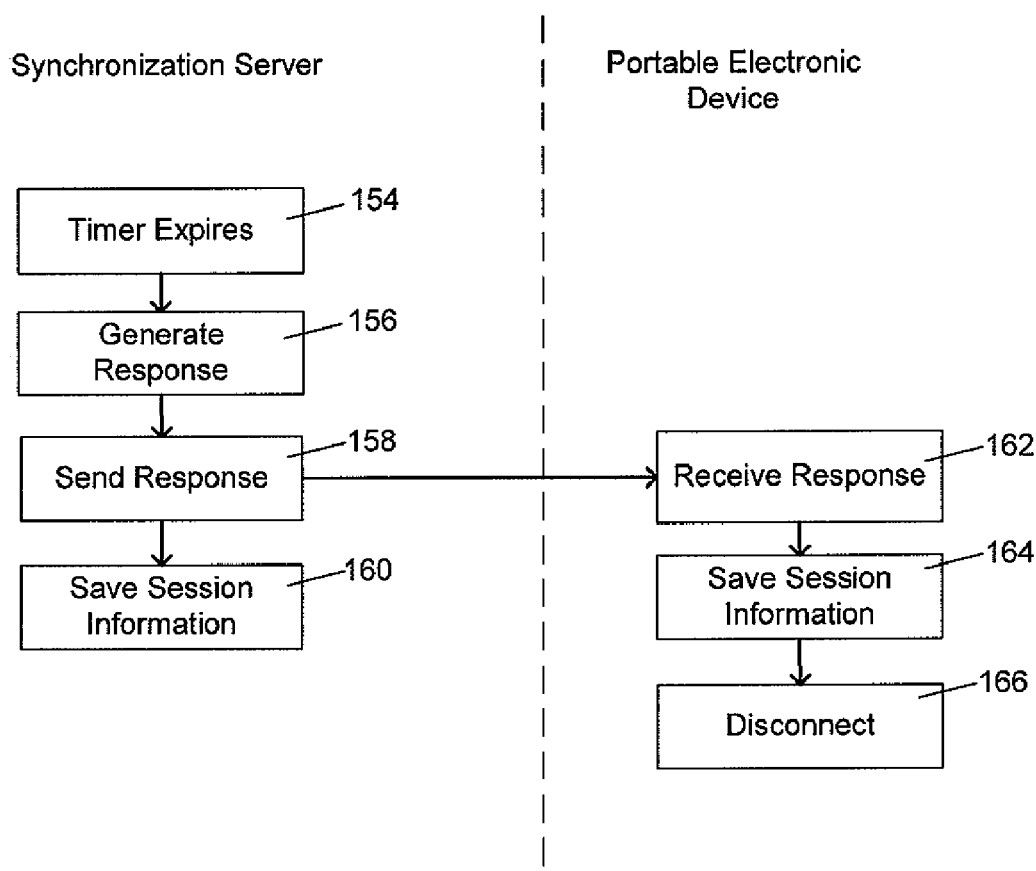
FIG. 7 is a sequence diagram illustrating further functions carried out at both the portable electronic device and the communication system of FIG. 1 during synchronization of databases connected by wireless interface.

Reference is now made to FIG. 6 to describe further functions carried out at both the portable electronic device 22 and the communication system 20 during synchronization of databases connected by wireless interface. As indicated above, the synchronization server 30 sets a timer at step 114 (FIG. 4), after sending the request to the personal information management connector 33. At step 122, a response is received from the personal information management connector 33. In the present example, the response is received within the time period set by the timer at step 114. Thus, the response is received within two minutes of the synchronization server 30 setting the timer and the timer ends. The response from the personal information management connector 33 includes the data records of the database 34.

At step 124 the processor 62 of the synchronization server 30 first generates a record hash for each data record of the database 34. The record hashes are referred to herein as the locally generated record hashes. From the locally generated record hashes, a group hash for the database 34 is generated. Thus, the group hash is representative of the data records of the database 34 and is referred to herein as the locally generated group hash. After generation of the locally generated group hash, the hash information of the group hash received from the portable electronic device 22 is compared with the hash information of the corresponding locally generated group hash at step 126. If the comparison of the hash information indicates that the database 40 of the portable electronic device 22 is not in mismatch with the respective database 34 of the communication system 20, then a response is sent to the portable electronic device 22 to terminate the synchronization session at step 128.

The response is received at the portable electronic device 22 at step 130 and the synchronization session is terminated at step 131.

If, on the other hand, the comparison of the hash information indicates that the database 40 of the portable electronic device 22 is in mismatch with the respective database 34 of the communication system 20, then one or both of the databases 34, 40 are to be updated and a request for additional hash information is generated by the synchronization server 30 at step 132. The request for additional hash information is a request for hash information associated with data records. The additional hash information is requested for each data record of the database 40 of the portable electronic device 22. After generation of the request for additional hash information, the request is then transmitted at step 134 to the portable electronic device 22.

Once the request for additional hash information is received at the portable electronic device 22 at step 136, each record hash generated at step 104 is transmitted at step 142 to the communication system 20 over the radio communication channel.

The additional hash information is received at the communication system 20 and delivered to the synchronization server 30 at step 144. In response to receipt of the requested additional hash information, each hash received from the portable electronic device 22 is compared with the corresponding additional locally generated hash (generated at step 124) at step 148 and a determination is made as to whether any of the data records of either or both the database 34 or the respective database 40 of the portable electronic device 22, has changed. For data records that are determined to match, the synchronization process ends at step 150 for those data records. For data records determined to be in mismatch, however, the comparison at step 148 also determines where the change was made (i.e. at the communication system 20 side or at the portable electronic device 22 side). Thus, data records in which changes have been made at one of the portable electronic device 22 and the communication system 20 that are not reflected in the corresponding data records at the other of the portable electronic device 22 and the communication system 20, are determined by the comparison at step 148. If it is determined at step 148 that the data has changed, the databases are synchronized by updating the data records of the database 34 at communication system 20 or the respective database 40 at the portable electronic device 22 or the databases 34, 40 at both the communication system 20 and the portable electronic device 22 that are determined to be mismatched at step 152. With the determination of a mismatch, a conflict resolution policy is run, thereby determining how the mismatched data records are to be updated (i.e. whether to update the database records on the portable electronic device 22 with the database records of the synchronization server 30, whether to update the database records of the synchronization server 30 with the database records on the portable electronic device 22, or whether to update both).

The additional hash information is received at the communication system 20 and delivered to the synchronization server 30 at step 144. In response to receipt of the requested additional hash information, each hash received from the portable electronic device 22 is compared with the corresponding additional locally generated hash (generated at step 124) at step 148 and a determination is made as to whether any of the data records of either or both the database 34 or the respective database 40 of the portable electronic device 22, have changed. For data records that are determined to match, the synchronization process ends at step 150 for those data records. For data records determined to be in mismatch, however, the comparison at step 148 also determines where the change was made (i.e. at the communication system 20 side or at the portable electronic device 22 side). Thus, data records in which changes have been made at one of the portable electronic device 22 and the communication system 20 that are not reflected in the corresponding data records at the other of the portable electronic device 22 and the communication system 20, are determined by the comparison at step 148. If it is determined at step 148 that the data has changed, the databases are synchronized by updating the data records of the database 34 at communication system 20 or the respective database 40 at the portable electronic device 22 or the databases 34, 40 at both the communication system 20 and the portable electronic device 22 that are determined to be mismatched at step 152. With the determination of a mismatch, a conflict resolution policy is run, thereby determining how the mismatched data records are to be updated (i.e. whether to update the database records on the portable electronic device 22 with the database records of the synchronization server 30, whether to update the database records of the synchronization server 30 with the database records on the portable electronic device 22, or whether to update both).

At step 162, the portable electronic device 22 receives the response including the temporary disconnect command from the synchronization server 30. The portable electronic device 22 saves the synchronization session state information including the session state identifier in the RAM 50 at step 164 and the synchronization session is temporarily disconnected at step 166. After disconnection of the synchronization session, other data that does not belong to the database 40 can be sent to and from the portable electronic device 22. Thus, the portable electronic device 22 is no longer idle.

When a response is received from the personal information management connector 33, at the synchronization server 30, the synchronization server 30 then restarts the synchronization session using the information stored in the RAM 66 of the synchronization server 30. Referring again to FIG. 6, the response is received from the personal information management connector 33 thereby restarting the synchronization session at step 122 and the synchronization server 30 generates the locally generated group hash as described above in relation to FIG. 6, step 124. After generation of the locally generated group hash, the hash information of the group hash received from the portable electronic device 22 is compared with the hash information of the corresponding locally generated group hash at step 126. If the comparison of the hash information indicates that the database 40 of the portable electronic device 22 is not in mismatch with the respective database 34 of the communication system 20, then a response is sent to the portable electronic device 22 to terminate the synchronization session at step 128.

The response is received at the portable electronic device 22 at step 130 and the synchronization session is terminated at step 131. Thus, the synchronization session state information is no longer stored in the RAM 50.

If, on the other hand, the comparison of the hash information indicates that the database 40 of the portable electronic device 22 is in mismatch with the respective database 34 of the communication system 20, then one or both of the databases 34, 40 are to be updated and a request is generated by the synchronization server 30 at step 132. In the present example, the request includes a restart session request to restart the synchronization session based on the session state information stored in the RAM 66 along with a request for additional hash information associated with data records. The additional hash information is requested for each data record of the database 40 of the portable electronic device 22. After generation of the request at step 132, the request is then transmitted at step 134 to the portable electronic device 22.

Once the request is received at the portable electronic device 22 at step 136, the portable electronic device 22 restarts the synchronization session using the information included in the request and the synchronization session state information stored in the RAM 50. In accordance with the request for additional hash information, each record hash generated at step 104 is transmitted at step 142 to the communication system 20 over the radio communication channel.

As described above, the additional hash information is received at the communication system 20 and delivered to the synchronization server 30 at step 144. In response to receipt of the requested additional hash information, each hash received from the portable electronic device 22 is compared with the corresponding additional locally generated hash at step 148. A determination is made as to whether any of the data records of either or both the database 34 or the database 40 of the portable electronic device 22, have changed. For data records that are determined to match, no further steps are taken. For data records determined to be in mismatch, however, the comparison at step 148 also determines where the change was made (i.e. at the communication system 20 side or at the portable electronic device 22 side). Thus, data records in which changes have been made at one of the portable electronic device 22 and the communication system 20 that are not reflected in the corresponding data records at the other of the portable electronic device 22 and the communication system 20, are determined by the comparison at step 148. If it is determined that the data has changed at step 148, the databases are synchronized by updating the data records of the database 34 at communication system 20 or the database 40 at the portable electronic device 22 or the databases 34, 40 at both the communication system 20 and the portable electronic device 22 that are determined to be mismatched at step 150. With the determination of a mismatch, a conflict resolution policy is run, thereby determining how the mismatched data records are to be updated (i.e. whether to update the database records on the portable electronic device 22 with the database records of the synchronization server 30 or vice versa or both). After updating of the data records, a final response is sent to the portable electronic device 22 to terminate the synchronization session at step 152.

The final response is received at the portable electronic device 22 at step 130 and the synchronization session is terminated at step 131.

According to one aspect there is provided a method for synchronizing a first database including first data records with a second database including second data records. The method includes starting a synchronization session with an electronic device on which the second database resides, requesting the first data records from the first database, temporarily disconnecting a synchronization session while awaiting receipt of the first data records, receiving the first data records, and restarting and completing the synchronization session.

Advantageously, when a portable electronic device awaits a response from a communication system during synchronizing, the synchronization session is temporarily disconnected allowing data flow from the portable electronic device. In a particular aspect, a synchronization server sets a timer and if the data records have not yet been retrieved from the appropriate databases, the synchronization server sends a response to the portable electronic device to temporarily disconnect the synchronizing session. Thus, a limit is set for the time that the portable electronic device sits idle awaiting a response. When the data records are received by the synchronization server, a determination of whether or not records are to be updated is made and a message is sent to the portable electronic device to either terminate the synchronization process if no records are to be updated on the portable electronic device or to restart the synchronization session.

While the embodiment described herein is directed to a particular implementation of the method and apparatus for synchronizing databases connected by wireless interface, it will be understood that modifications and variations to this embodiment are within the sphere and scope of the present application. For example, it will be understood that the portable electronic device 22 is not limited to three databases as any suitable number of databases is possible. Similarly, the communication system 20 may include any suitable number of databases. It will also be understood that the steps described hereinabove are not limited to the order in which they are described. The steps described can be performed in any suitable order as may occur to those skilled in the art.

Many other modifications and variations may occur to those skilled in the art. All such modifications and variations are believed to be within the sphere and scope of the present application.

The invention claimed is:

1. A method for synchronizing a first database including first data records with a second database including second data records, the method comprising:
   starting a synchronization session with an electronic device comprising said second database;
   requesting, by a second electronic device, said first data records from said first database and responsively setting a timer establishing a time limit for the second electronic device to receive said first records;
   when said timer expires prior to said second electronic device receiving said first data records, said electronic device:
      disconnecting said synchronization session while awaiting receipt of said first data records;
      sending a request to restart the synchronization session to said electronic device after receiving said first data records; and
      completing said synchronization session with said electronic device after receiving said first data records;
   otherwise, when said first data records are received by said second electronic device prior to expiry of said timer, said second electronic device:
      receiving said first data records; and
      completing said synchronization session with said electronic device;
   wherein completing said synchronization session comprises: generating a record hash for each of said first data records; comparing each record hash from said first data records with a corresponding record hash from said second data records; and updating at least one of said first data records and said second data records.

2. The method according to claim 1, wherein the disconnecting comprises saving synchronization session information.

3. The method according to claim 1, wherein starting a synchronization session comprises receiving an initialize command from said electronic device.

4. The method according to claim 1, further comprising receiving information representative of said second data records prior to requesting said first data records.

5. The method according to claim 4, wherein said comparing occurs after receiving said first data records.

6. The method according to claim 4, wherein receiving information representative of said second data records comprises receiving a group hash of said second data records.

7. The method according to claim 1, wherein completing said synchronization session further comprises sending a response to the electronic device to terminate the synchronization session in the event that the first data records match the second data records.

8. The method according to claim 1, wherein completing said synchronization session further comprises sending a request for additional information associated with said second data records.

9. A non-transitory computer-readable medium having computer readable code embodied therein for:
   starting a synchronization session with an electronic device on which a second database resides, wherein said second database includes second data records;
   requesting, by a second electronic device, from a first database including first data records said first data records and responsively setting a timer establishing a time limit for the second electronic device to receive said first records;
   when said timer expires prior to said second electronic device receiving said first data records, said second electronic device:
      disconnecting said synchronization session while awaiting receipt of said first data records;
      sending a request to restart the synchronization session to said electronic device after receiving said first data records; and
      completing said synchronization session with said electronic device after receiving said first data records;
   otherwise, when said first data records are received by said second electronic device prior to expiry of said timer, said second electronic device:
      receiving said first data records; and
      completing said synchronization session with said electronic device;
   wherein completing said synchronization session comprises: generating a record hash for each of said first data records; comparing each record hash from said first data records with a corresponding record hash from said second data records; and updating at least one of said first data records and said second data records.

* * * * *